United States Patent
Soleimani et al.

(10) Patent No.: US 11,704,351 B1
(45) Date of Patent: Jul. 18, 2023

(54) MACHINE-LEARNING MODEL FOR PERFORMING CONTEXTUAL SUMMARIZATION OF TEXT DATA

(71) Applicant: SAS Institute Inc., Cary, NC (US)

(72) Inventors: Reza Soleimani, Raleigh, NC (US); Samuel Leeman-Munk, Durham, NC (US); David Blake Styles, Raleigh, NC (US)

(73) Assignee: SAS Institute, Inc., Cary, NC (US)

(*) Notice: Subject to any disclaimer, the term of this patent is extended or adjusted under 35 U.S.C. 154(b) by 0 days.

(21) Appl. No.: 17/976,461

(22) Filed: Oct. 28, 2022

Related U.S. Application Data

(60) Provisional application No. 63/353,772, filed on Jun. 20, 2022.

(51) Int. Cl.
  *G06F 16/34* (2019.01)
  *G06F 40/40* (2020.01)
  *G06F 40/284* (2020.01)

(52) U.S. Cl.
  CPC .......... *G06F 16/34* (2019.01); *G06F 40/284* (2020.01); *G06F 40/40* (2020.01)

(58) Field of Classification Search
  CPC ......... G06F 16/34; G06F 40/284; G06F 40/40
  USPC .......................................................... 704/9
  See application file for complete search history.

(56) References Cited

PUBLICATIONS

Automatic Summarization—Wikipedia, https://en.wikipedia.org/wiki/Automatic_summarization#Extraction-based_summarization, last edited Aug. 19, 2022, 15 pages.
A. Roy, "Understanding Automatic Text Summarization-1: Extractive Methods", Towards Data Science, https://towarsdatascience.com/understanding-automatic-text-summarization-1-extractive-methods-8eb512b21ecc, 2020, 15 pages.
M. Maddela et al., "EntSUM: A Data Set for Entity-Centric Summarization", https://arxiv.org/abs/2204.02213, 2022, 6 pages.

*Primary Examiner* — Thierry L Pham
(74) *Attorney, Agent, or Firm* — Kilpatrick Townsend & Stockton LLP

(57) ABSTRACT

In one example, a system can receive a set of text samples and generate a set of summaries based on the set of text samples. The system can then generate a training dataset by iteratively executing a training-sample generation process. Each iteration can involve selecting multiple text samples from the set of text samples, combining the multiple text samples together into a training sample, determining a text category and a summary corresponding to a selected one of the multiple text samples, and including the text category and the summary in the training sample. After generating the training dataset, the system can use it to train a model. The trained model can then receive a target textual dataset and a target category as input, identify a portion of the target textual dataset corresponding to the target category, and generate a summarization of the portion of that target textual dataset.

30 Claims, 19 Drawing Sheets

1900

Freddie Ljunberg says the goalkeeper must stop letting thorugh bad goals or face another season of euro heartache. The disappointed swede reckons the gunners have already wasted a golden opportunity. Royal Dutch / shell merges holding companies with unified board London, October 28 (newratings.com) – royal Dutch / Shell group has announced its plans to merge its two holding companies in the Netherlands and the UK, royal Dutch petroleum (Roy.). *A new version of Google groups has launched. Shannon Bauman, associated product manager of Google groups, announced the launch of a new and improved Google group system. Whether your interests are knitting or brain surgery, chances are good other people out there share them.*

BOLD = Sports
<u>UNDERLINED</u> = Business
*ITALICIZED* = Technology

FIG. 19

MACHINE-LEARNING MODEL FOR PERFORMING CONTEXTUAL SUMMARIZATION OF TEXT DATA

REFERENCE TO RELATED APPLICATIONS

This claims the benefit of priority under 35 U.S.C. § 119(e) to U.S. Provisional Patent Application No. 63/353,772, filed Jun. 20, 2022, the entirety of which is hereby incorporated by reference herein.

TECHNICAL FIELD

The present disclosure relates generally to machine learning on a computer. More specifically, but not by way of limitation, this disclosure relates to training and using a machine-learning model to perform contextual summarization of text data.

BACKGROUND

Automatic summarization is a computerized process for automatically creating a summary of data, where the summary represents the most important or relevant information within the original data. When automatic summarization is applied to text data (e.g., as opposed to images or videos), it can be referred to as text summarization. Text summarization can involve a computer automatically generating a summary of the most important content in a text dataset.

There are generally two approaches to automatic text summarization—extractive summarization and abstractive summarization. Extractive summarization involves a computer extracting the most-important content (e.g., words, phrases, or sentences) from a text dataset and combining it together to create a summary, without modifying the extracted content. As a result, the summary is merely a collection of content copied directly from the original text dataset. The summary does not include any new content that was not in the original text dataset. Conversely, abstractive summarization involves a computer generating new content for inclusion in the summary, where the new content was not in the original text dataset. The summary may also include copies of content from the original text dataset. Because abstractive summarization involves the creation of new content, abstractive summarization can be more complex to implement than extractive summarization.

SUMMARY

One example of the present disclosure includes a system comprising one or more processors and one or more storage devices including instructions that are executable by the one or more processors for causing the one or more processors to perform operations. The operations can include receiving a plurality of text samples corresponding to a plurality of text categories, each text sample of the plurality of text samples corresponding to a respective category of the plurality of text categories. The operations can include providing the plurality of text samples as input to a summarization model that is configured to generate a plurality of summaries of the plurality of text samples. The operations can include generating a training dataset by iteratively performing a training-sample generation process until a stopping condition is met. The training-sample generation process can involve: selecting a first text sample and a second text sample from the plurality of text samples, wherein the first text sample and the second text sample correspond to different categories of the plurality of text categories; generating a training sample that includes the first text sample and the second text sample; determining a text category corresponding to the first text sample; incorporating an identifier of the text category into the training sample; selecting a summary corresponding to the first text sample from among the plurality of summaries; incorporating the summary into the training sample; and storing the training sample as part of the training dataset. The operations can include training a model based on the training dataset to generate a trained model. The trained model can be configured to: receive a target textual dataset and a target category as input, the target category being one of the plurality of text categories; identify a portion of the target textual dataset corresponding to the target category; and generate an output that includes a summarization of the portion of the target textual dataset corresponding to the target category.

Another example of the present disclosure includes a non-transitory computer-readable medium comprising program code that is executable by one or more processors for causing the one or more processors to perform operations. The operations can include receiving a plurality of text samples corresponding to a plurality of text categories, each text sample of the plurality of text samples corresponding to a respective category of the plurality of text categories. The operations can include providing the plurality of text samples as input to a summarization model that is configured to generate a plurality of summaries of the plurality of text samples. The operations can include generating a training dataset by iteratively performing a training-sample generation process until a stopping condition is met. The training-sample generation process can involve: selecting a first text sample and a second text sample from the plurality of text samples, wherein the first text sample and the second text sample correspond to different categories of the plurality of text categories; generating a training sample that includes the first text sample and the second text sample; determining a text category corresponding to the first text sample; incorporating an identifier of the text category into the training sample; selecting a summary corresponding to the first text sample from among the plurality of summaries; incorporating the summary into the training sample; and storing the training sample as part of the training dataset. The operations can include training a model based on the training dataset to generate a trained model. The trained model can be configured to: receive a target textual dataset and a target category as input, the target category being one of the plurality of text categories; identify a portion of the target textual dataset corresponding to the target category; and generate an output that includes a summarization of the portion of the target textual dataset corresponding to the target category.

Still another example of the present disclosure includes a method comprising operations. The operations can include receiving a plurality of text samples corresponding to a plurality of text categories, each text sample of the plurality of text samples corresponding to a respective category of the plurality of text categories. The operations can include providing the plurality of text samples as input to a summarization model that is configured to generate a plurality of summaries of the plurality of text samples. The operations can include generating a training dataset by iteratively performing a training-sample generation process until a stopping condition is met. The training-sample generation process can involve: selecting a first text sample and a second text sample from the plurality of text samples, wherein the first text sample and the second text sample correspond to different categories of the plurality of text categories; generating a training sample that includes the first text sample and the second text sample; determining a text category corresponding to the first text sample; incorporating an identifier of the text category into the training sample; selecting a summary corresponding to the first text sample from among the plurality of summaries; incorporating the summary into the training sample; and storing the training sample as part of the training dataset. The operations can include training a model based on the training dataset to generate a trained model. The trained model can be configured to: receive a target textual dataset and a target category as input, the target category being one of the plurality of text categories; identify a portion of the target textual dataset corresponding to the target category; and generate an output that includes a summarization of the portion of the target textual dataset corresponding to the target category. Some or all of the operations can be implemented by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 19 shows an example of a target textual dataset according to some aspects of the present disclosure.

Figure 1:
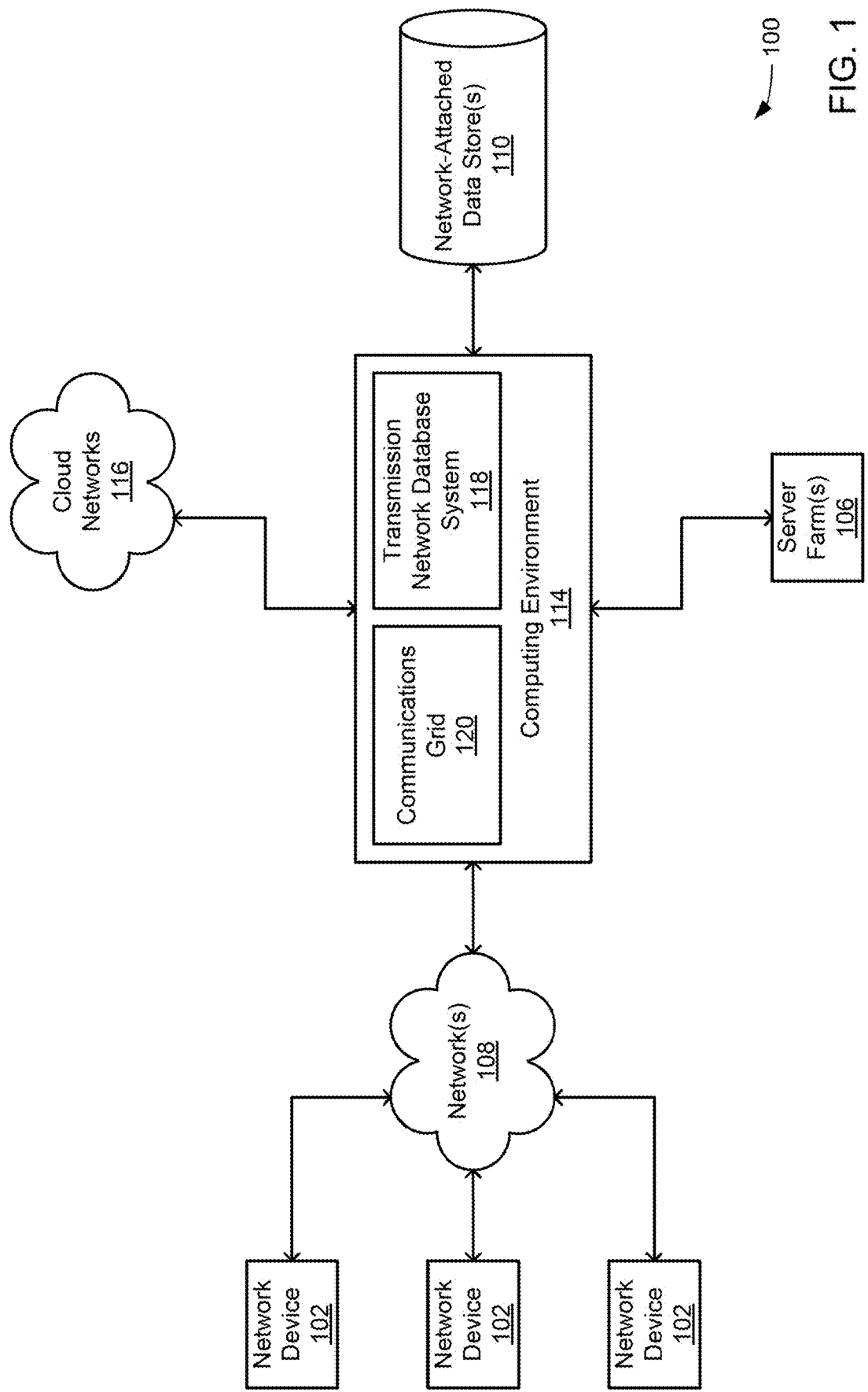
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Automatic text summarization can involve a computer using a model (e.g., a machine-learning model) to automatically generate a summary of a text input. Some text input can include a mixture of multiple categories of content. This text input can be supplied to a summarization model, which can generate a summary of the text input. While some summarization models are designed to accept text input that includes multiple categories of content, the resulting summaries can often be inaccurate. This is because the summarization model is normally not provided with any contextual information about what to summarize and, as a result, it may generate a summary based on irrelevant information.

Some examples of the present disclosure can overcome one or more of the abovementioned problems by providing a novel process for training a summarization model that allows the summarization model to automatically and accurately perform text summarization on a text input that includes multiple different categories of content. As will be described in greater detail later on, the training process involves generating training samples that include combinations of textual content from different categories along with corresponding labels and summaries. After undergoing this training process, the summarization model can receive a text input along with a selection of a category of content that is to be summarized. The category selection can serve as contextual information that informs the summarization model of what to summarize. The summarization model can then automatically and accurately generate a summary that emphasizes content relevant to the selected category. Because the summary corresponds to the selected category, the summary may substantially or entirely exclude other information corresponding to the other categories of content described in the text input.

In some examples, the summarization model can be validated for accuracy using a classifier model that is separate from the summarization model. For example, a computer system can execute the summarization model to automatically summarize a particular subset of a text input, where the particular subset corresponds to a particular content category (e.g., topic or language) selected by a user. The computer system can then provide the summary as input to the classifier model. The classifier model can be configured to receive the summary as input, predict a content category associated with the summary, and output the predicted category. The computer can then compare the predicted category from the classifier model to the particular content category selected by the user. If the two match, it may mean that the summarization model has an acceptable degree of accuracy. If the two do not match, the summarization model may be inaccurate and require further training. Using this technique, the accuracy of the summarization model can be validated. Other validation approaches can also be used.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
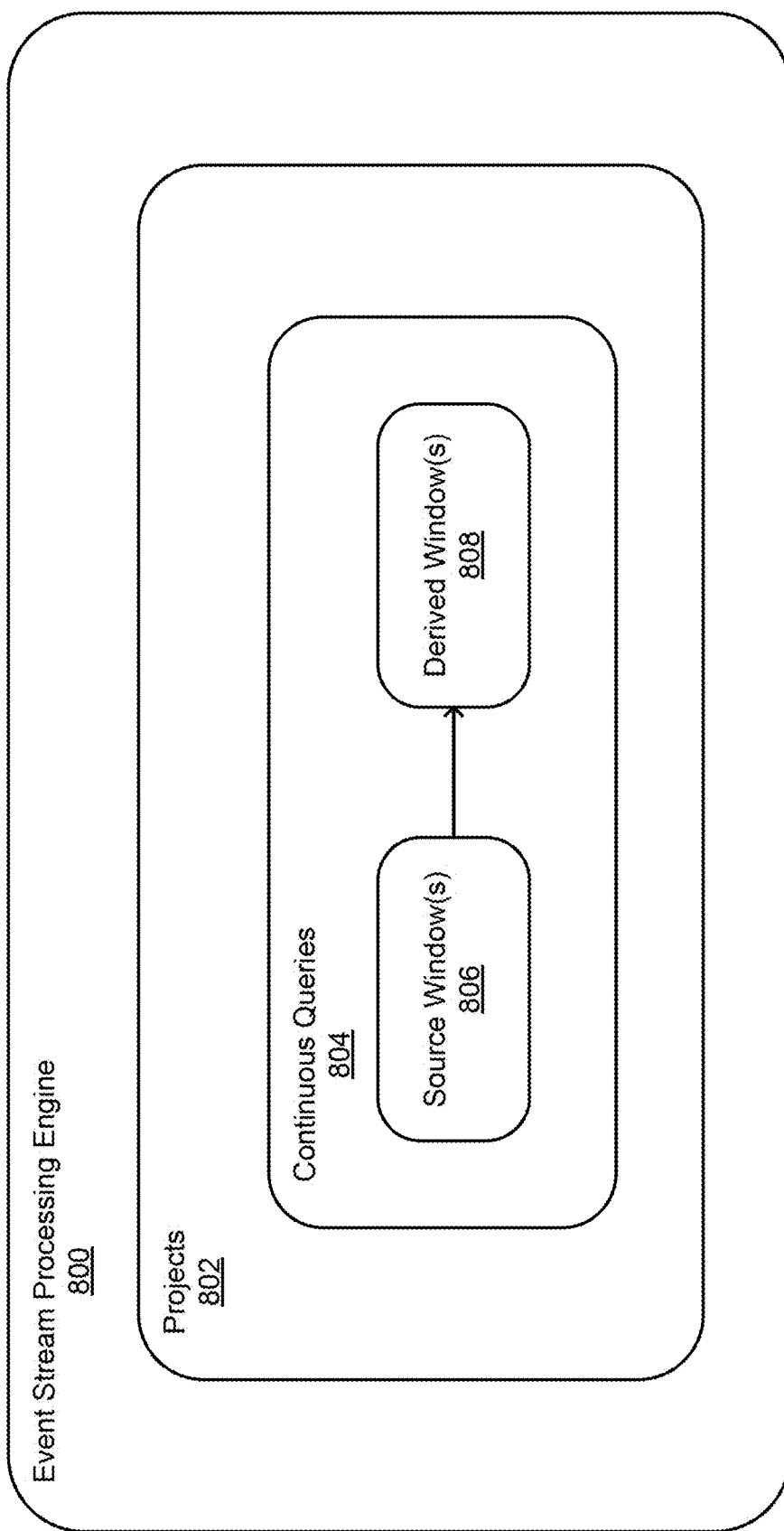
FIG. 8 shows a block diagram including components of an Event Stream Processing Engine (ESPE) according to some aspects of the present disclosure.
Figure 9:
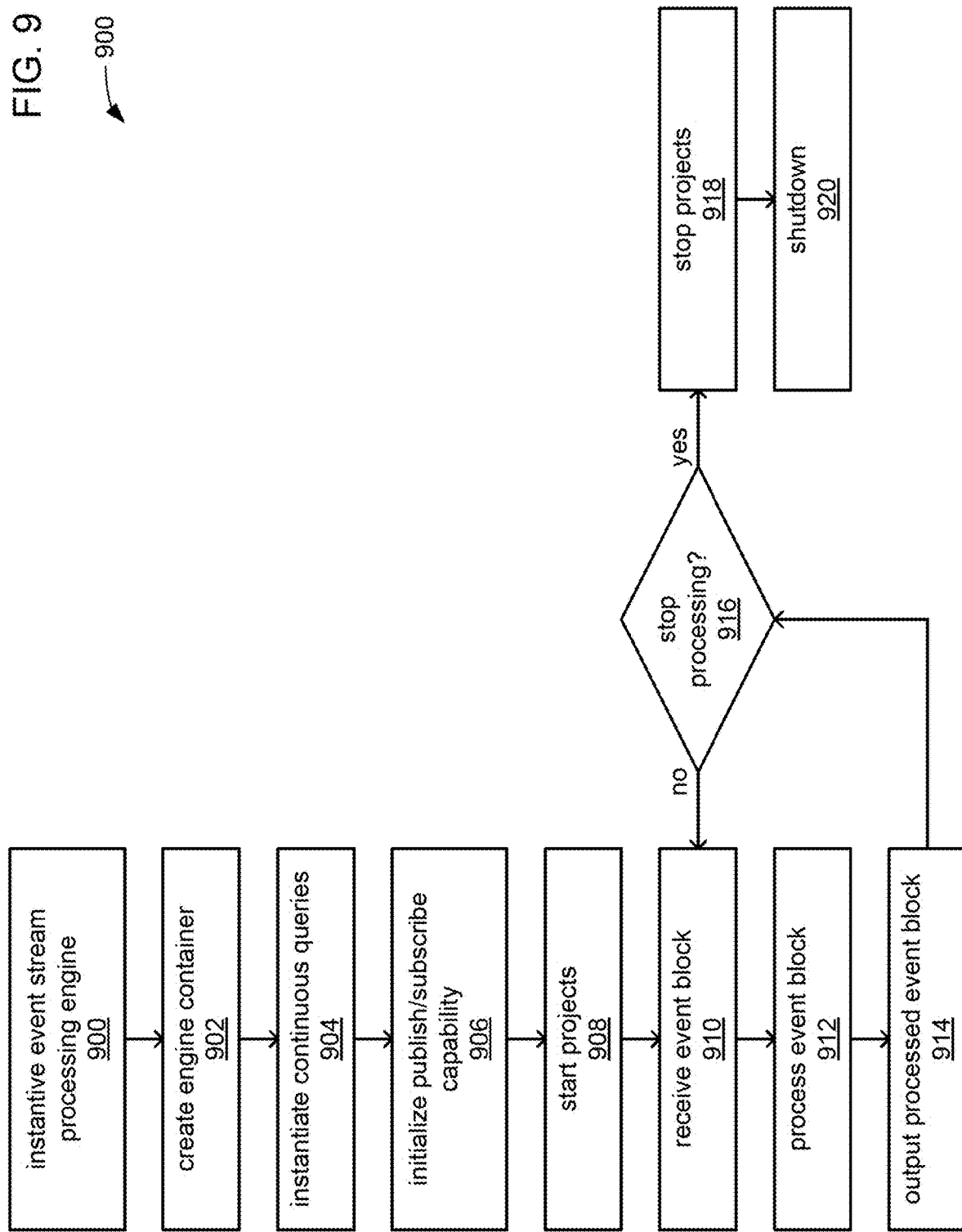
FIG. 9 shows a flow chart of an example process including operations performed by an event stream processing engine according to some aspects of the present disclosure.
Figure 10:
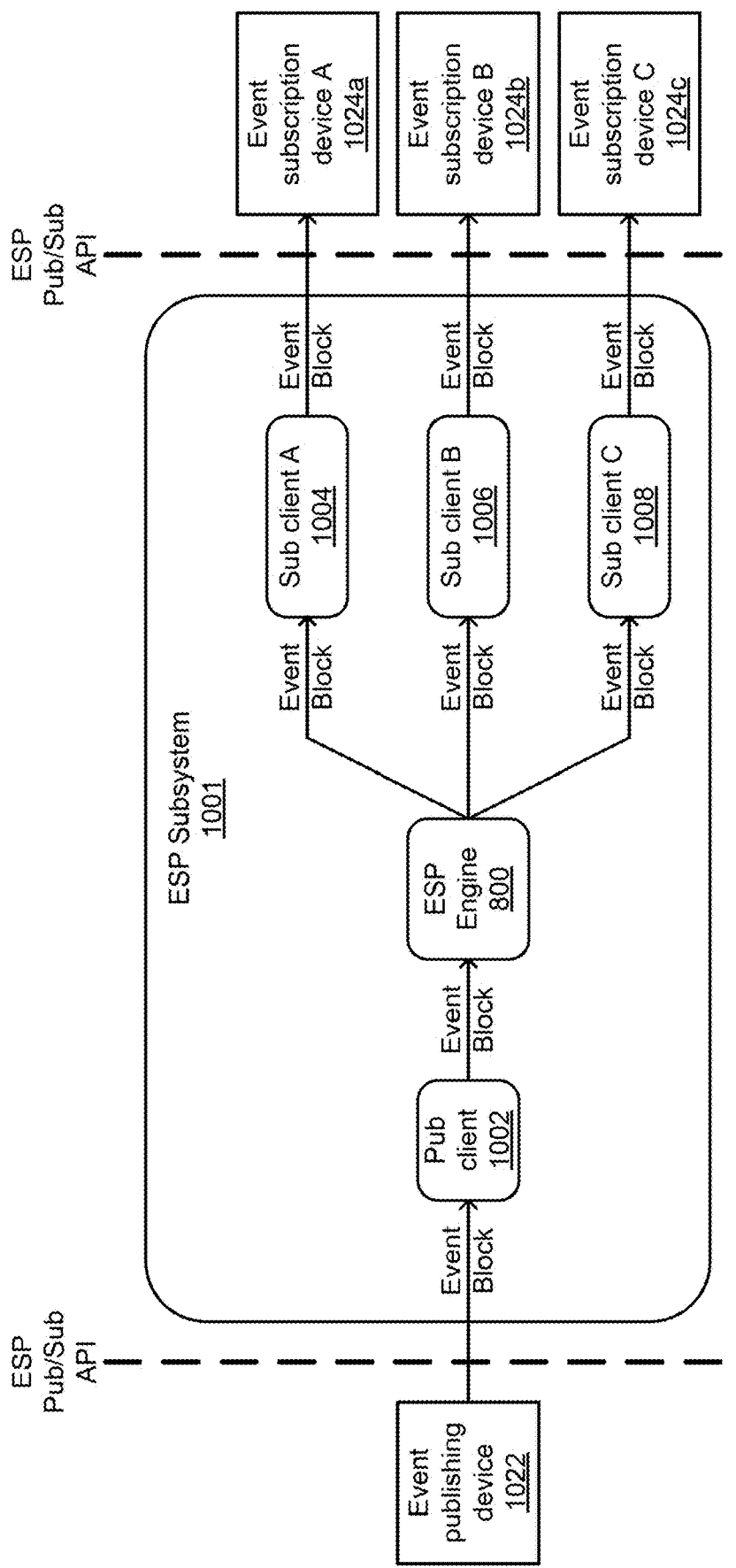
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
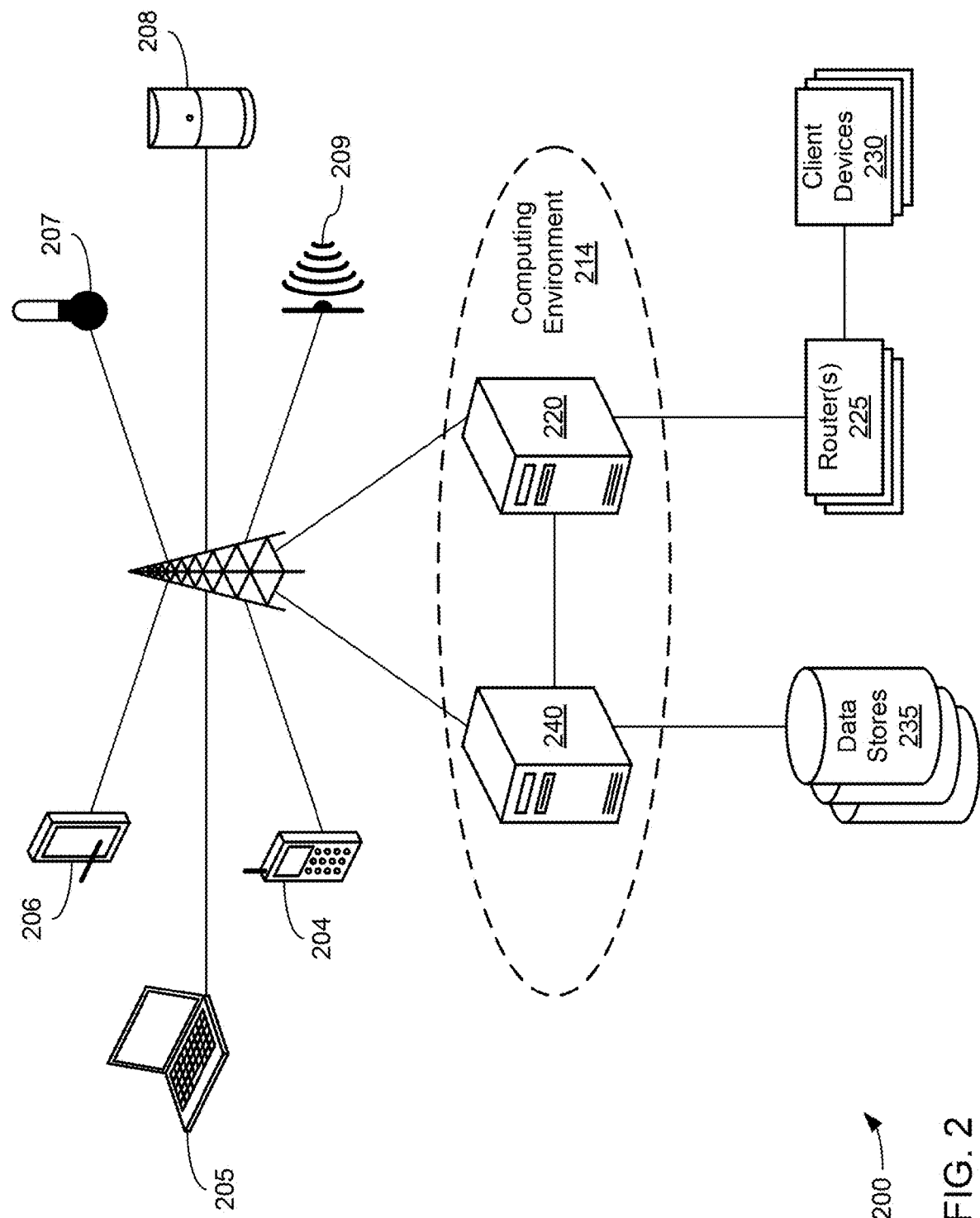
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
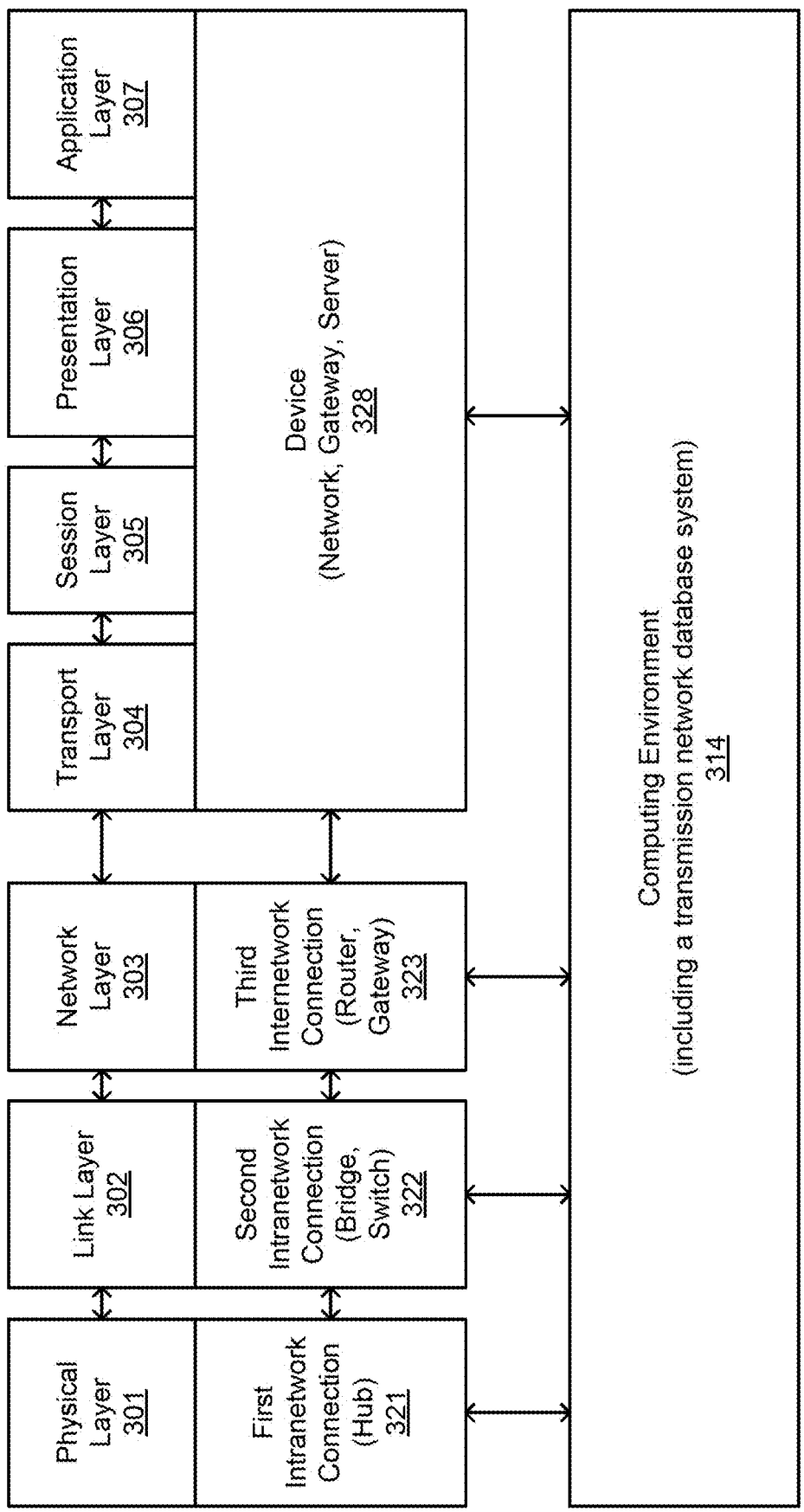
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
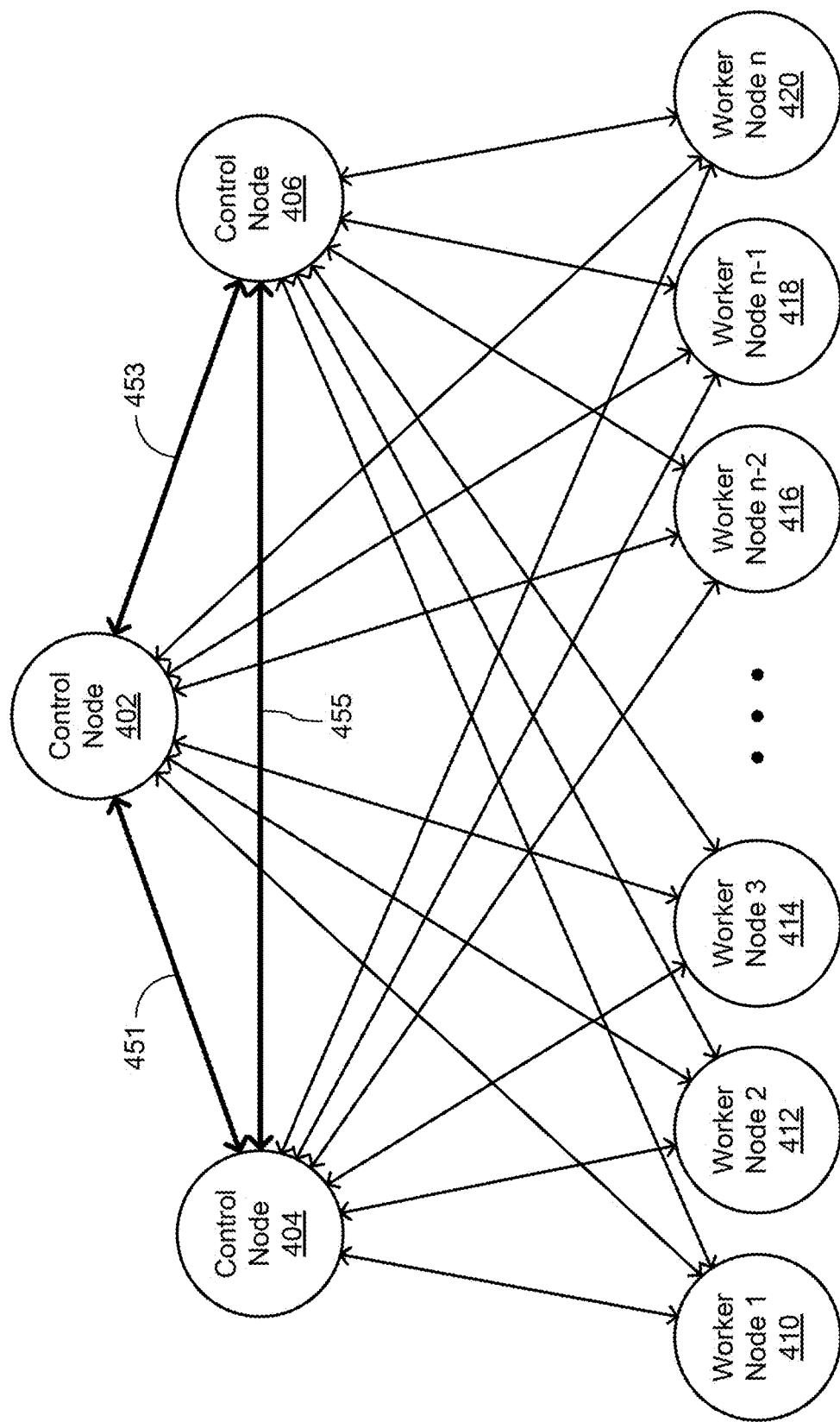
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
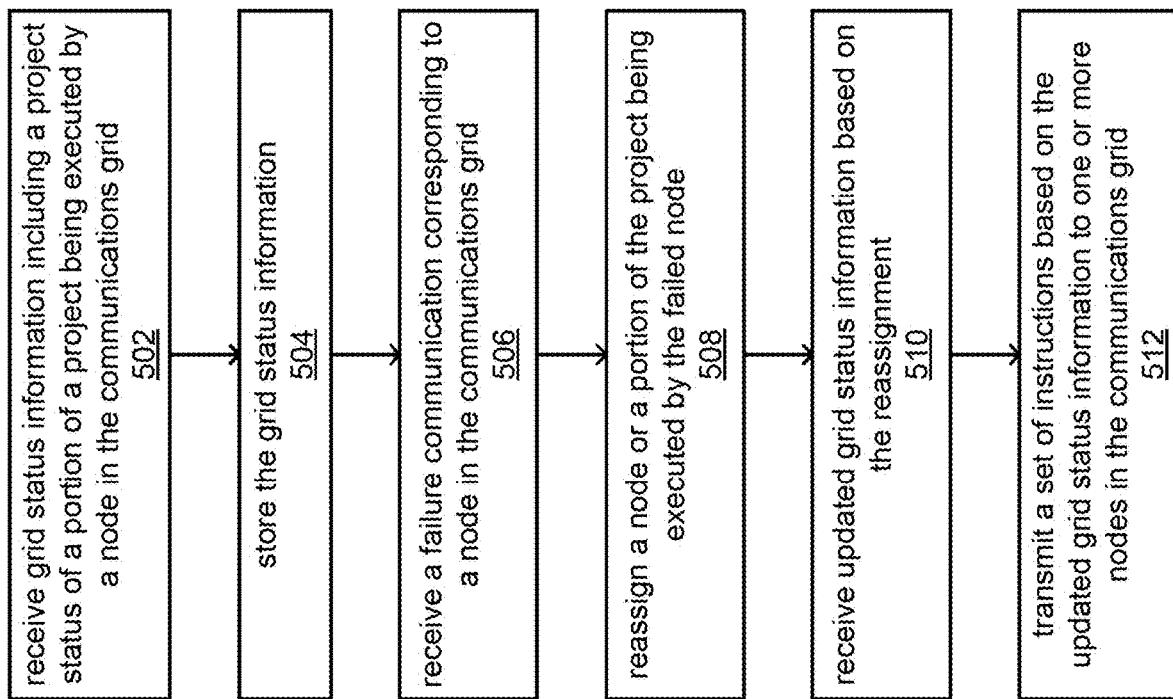
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
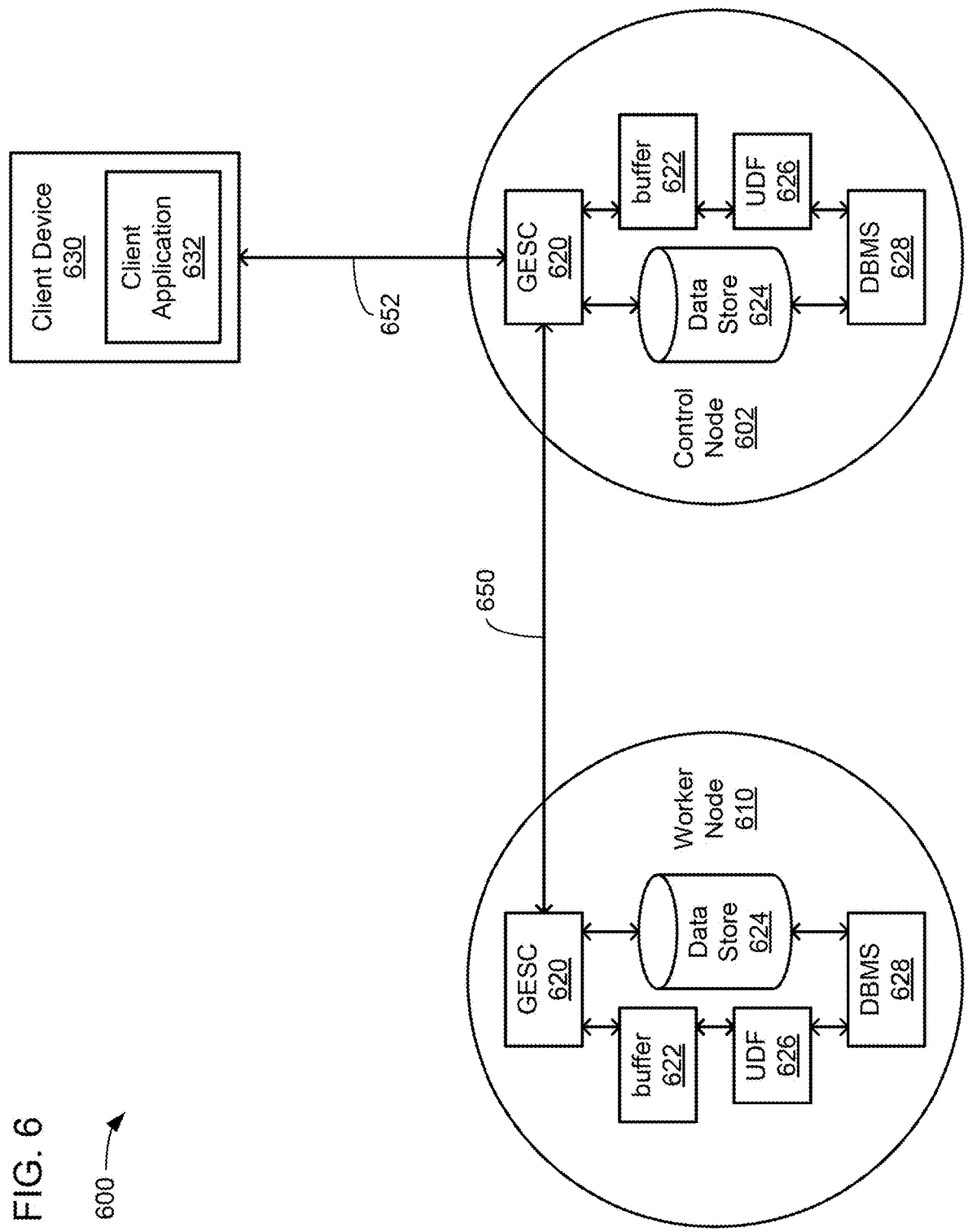
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
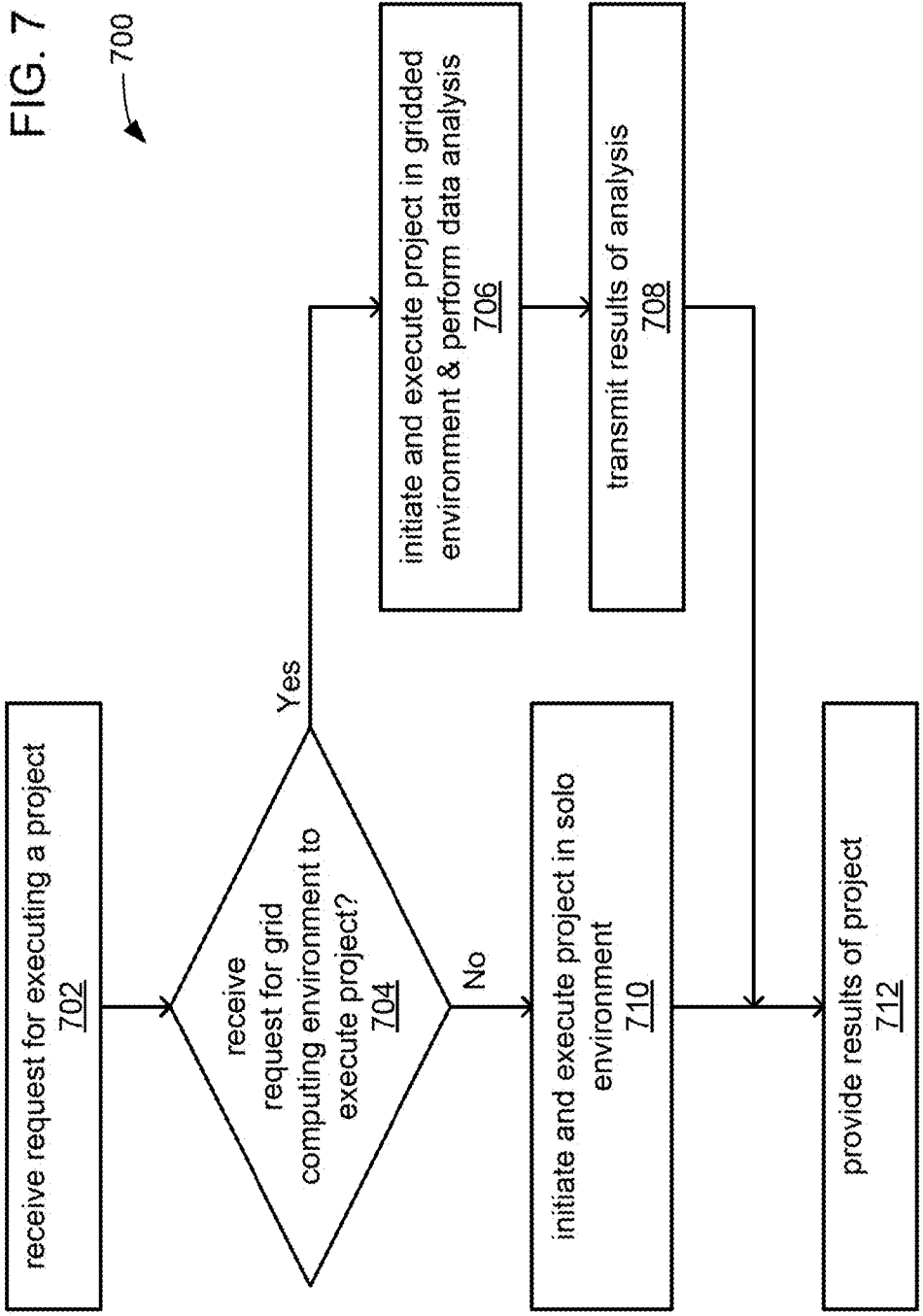
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
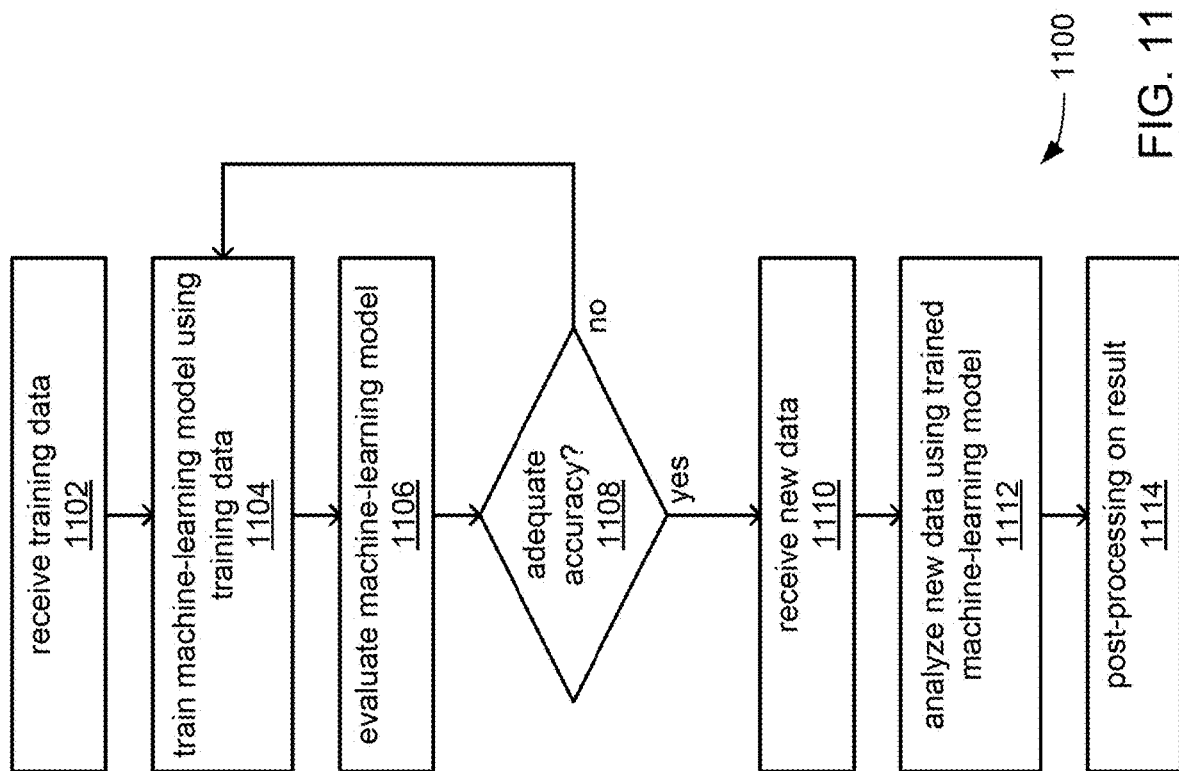
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
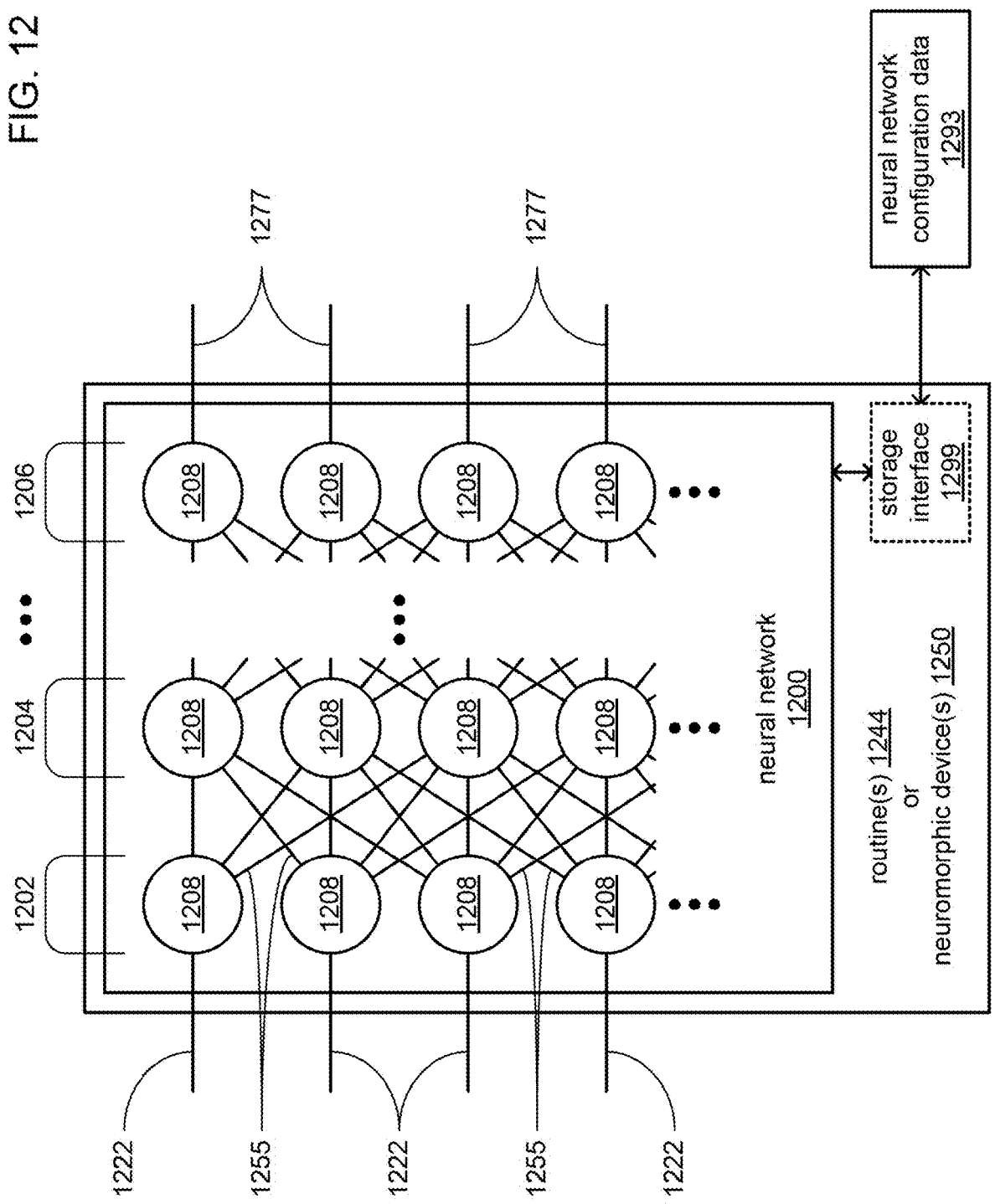
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
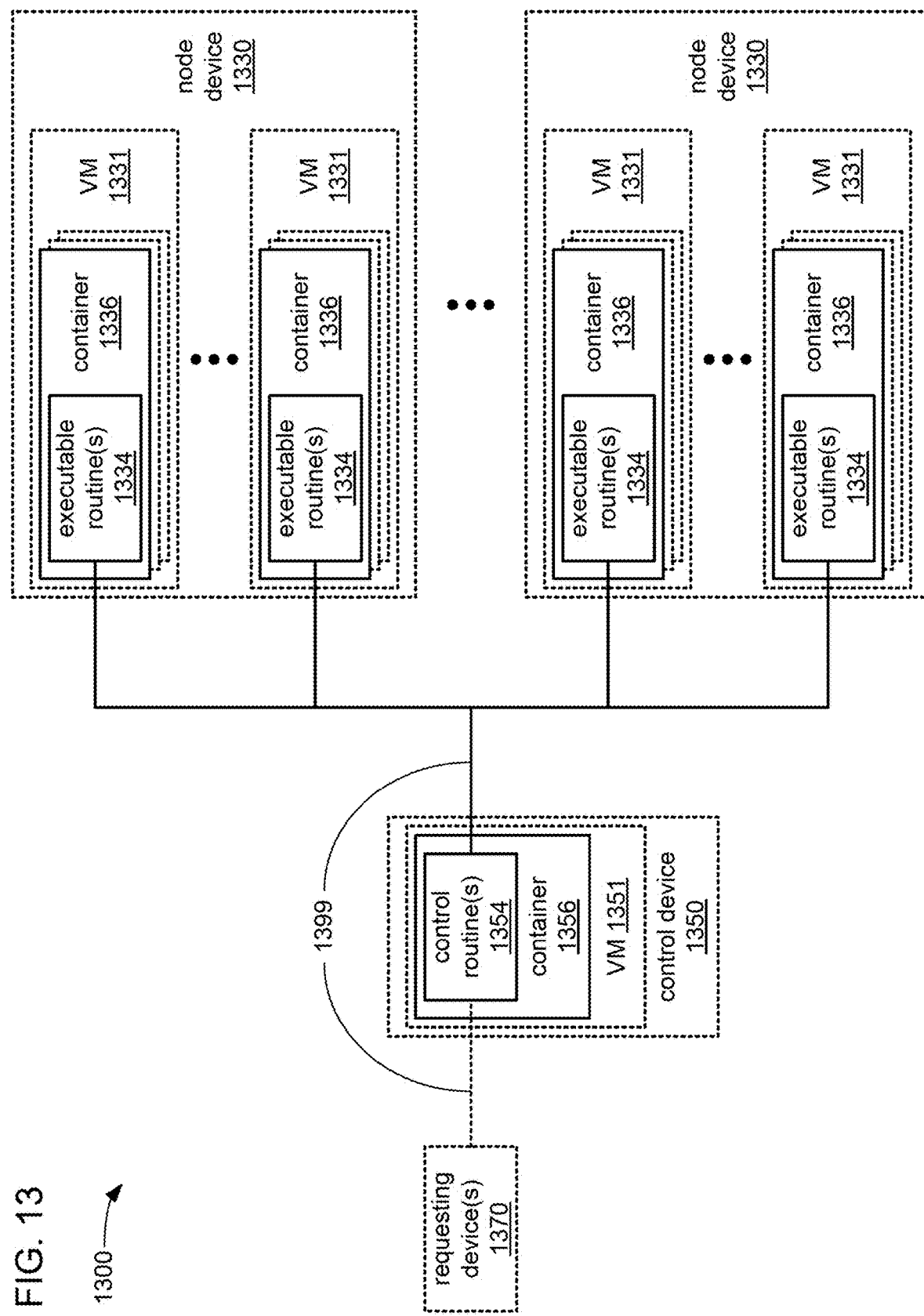
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
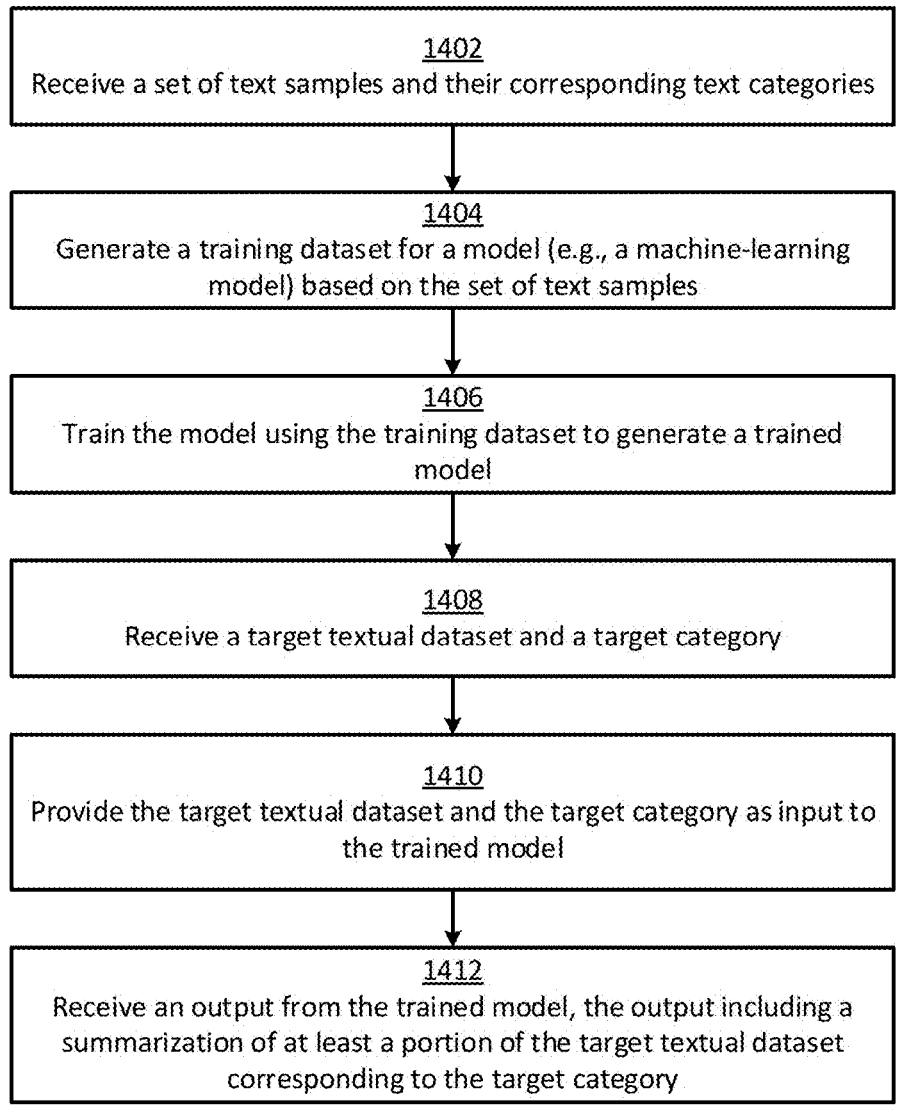
FIG. 14 shows a flowchart of an example of a process for training a model and using it to summarize a target textual dataset according to some aspects of the present disclosure.

FIG. 14 shows a flowchart of an example of a process for training a model and using it to summarize a target textual dataset according to some aspects of the present disclosure. Other examples may involve more operations, fewer operations, different operations, or a different order of operations than is shown in FIG. 14.

In block 1402, a computer system receives a set of text samples and their corresponding text categories. For example, the computer system can download a set of text samples that are prelabeled with their corresponding text categories. Each text sample can be assigned a corresponding text category. The computer system can receive the set of text samples and their corresponding text categories from one or more sources via a network, such as the Internet. Examples of the one or more sources can include one or more databases, one or more repositories, or any combination thereof.

In block 1404, the computer system generates a training dataset for a model based on the set of text samples and their corresponding text categories. Examples of the model can include a seq2seq model, a long short-term memory (LSTM) recurrent neural network, or a Bidirectional Encoder Representations from Transformers (BERT) model. One example of a process for generating the training dataset is described in greater detail below with respect to FIGS. 15-17. But in general, the computer system can generate the training dataset by iteratively performing a training-sample generation process until a stopping condition is met. Each iteration of the training-sample generation process can produce a training sample for inclusion in the training dataset.

To produce each training sample, the computer system can select at least two text samples from the set of text samples, where the at least two text samples correspond to different text categories. For example, the computer system can select a first text sample and a second text sample from the set of text samples, where the ordinal terms "first" and "second" are merely used to distinguish the two text samples from one another (rather than designate an order of the text samples in the set of text samples). The computer system can then aggregate the at least two text samples together to create the training sample. For example, the training sample can include a first field with the first text sample and a second field with the second text sample. Additionally, the computer system can select (e.g., randomly or according to a predefined algorithm) a text sample from among the at least two text samples. For example, the computer system can select the first text sample from among the first and second text samples. The computer system can then determine which text category is assigned to the selected text sample, and incorporate an identifier of the text category into the training sample. For example, the computer system can determine which text category is assigned to the first text sample, and incorporate an identifier of the text category into the training sample. The computer system may also incorporate a summary of the selected text sample into the training sample. For example, the computer system can incorporate a summary of the first text sample into the training sample. Thus, the training sample can have four fields—the first text sample, the second text sample, the text category assigned to the first text sample, and the summary of the first text sample. Of course, other examples may involve more fields, fewer fields, different fields, or a different order of the fields. The computer system can then store training sample as part of the training dataset.

In block 1406, the computer system trains the model using the training dataset to generate a trained model. For example, the computer system can implement a supervised learning process using the training data to train the model. Training the model can transform the model from an untrained state to a trained state. By providing the text category as one of the fields in the training data (e.g., in each training sample), the model may be trained to accept the text category as an input field, as described later on. Once trained, the model can be configured to receive a target textual dataset and a target category (e.g., a target text category) as input, and generate an output that includes a summarization emphasizing whichever content of the target textual dataset matches the target category. In this way, the target category can serve as a type of contextual information that enables the trained model to focus on the most relevant content.

In block 1408, the computer system receives a target textual dataset and a target category. The computer system can receive the target textual dataset from one or more sources. For example, the computer system can obtain the target textual dataset from one or more databases or websites. The target textual dataset may be different from the set of text samples and the training samples. For example, the target textual dataset may be a new dataset that was not previously used during the training process for the model. Because the target textual dataset may include content spanning multiple different text categories, the computer system can also be configured to receive the target category. The target category may be selected by a user and can designate which text category is to be the focus of the summarization process. For instance, the target textual dataset may include first content corresponding to a first text category, second content corresponding to a second text category, and third content corresponding to a third text category. If the second text category is of most interest to the user, the user may provide user input indicating that the target category is the second text category.

In block 1410, the computer system provides the target textual dataset and the target category as input to the trained model. For example, the computer system can combine (e.g., concatenate) the target textual dataset and the target category into a single input that it can supply to the trained model. In some such examples, the single input can include the target textual dataset as a first input field and the target category as a second input field.

In block 1412, the computer system receives an output from the trained model, the output including a summarization of at least a portion of the target textual dataset corresponding to the target category. For example, the target textual dataset may include first content corresponding to a first text category, second content corresponding to a second text category, and third content corresponding to a third text category. If the user selected the second text category as the target category, then the trained model can identify the second content as belonging to the second text category, generate a summarization of the second content, and output the summarization. The summarization may only be derived from only the second content (and not the first content or the third content).

Figure 15:
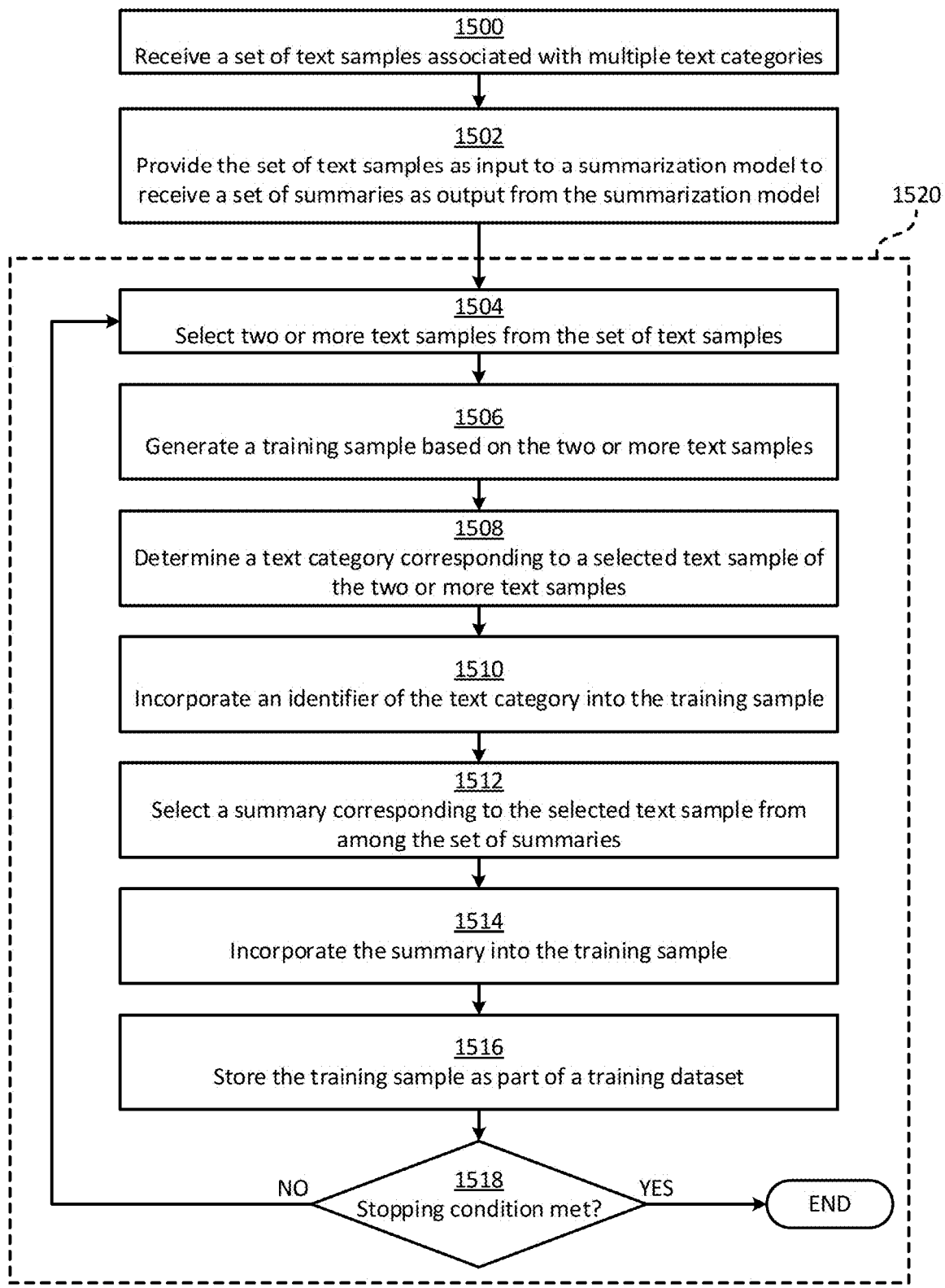
FIG. 15 shows a flowchart of an example of a process for generating training data for training a model according to some aspects of the present disclosure.

FIG. 15 shows a flowchart of an example of a process for generating training data for training a model according to some aspects of the present disclosure. Other examples may include more operations, fewer operations, different operations, or a different order of operations than is shown in FIG. 15.

In block 1500, a computer system receives a set of text samples. Each text sample can include one or more sentences formed from multiple textual tokens (e.g., words, characters, etc.). The set of text samples can include any number and combination of text samples received from any number and combination of sources, such as one or more databases. For example, the set of text samples may include 10,000 or more text samples.

The set of text samples can be associated with multiple text categories. A "text category" can be a class of textual content. One example of the multiple text categories can include various topics, such as cooking, cleaning, and home renovation. Another example of the multiple text categories can include various sentiments, such as positive sentiment, negative sentiment, and neutral sentiment. Each text sample can correspond to a particular text category. For example, a first text sample can correspond to a first text category (e.g., sports news), a second text sample can correspond to a second text category (e.g., business news), and a third text sample can correspond to a third text category (e.g., technology news).

Each text sample may have a corresponding category label. The category label can indicate the text category associated with the text sample. The category labels may have previously been assigned the text samples, and these assignments may be stored in one or more files. For example, a human may have manually assigned a respective category label to each text sample by storing these assignments in a file. The category label for a given text sample may be stored in any suitable location, such as in a separate file or in the metadata of the text sample (e.g., so that the category label can travel with the text sample).

Figure 16:
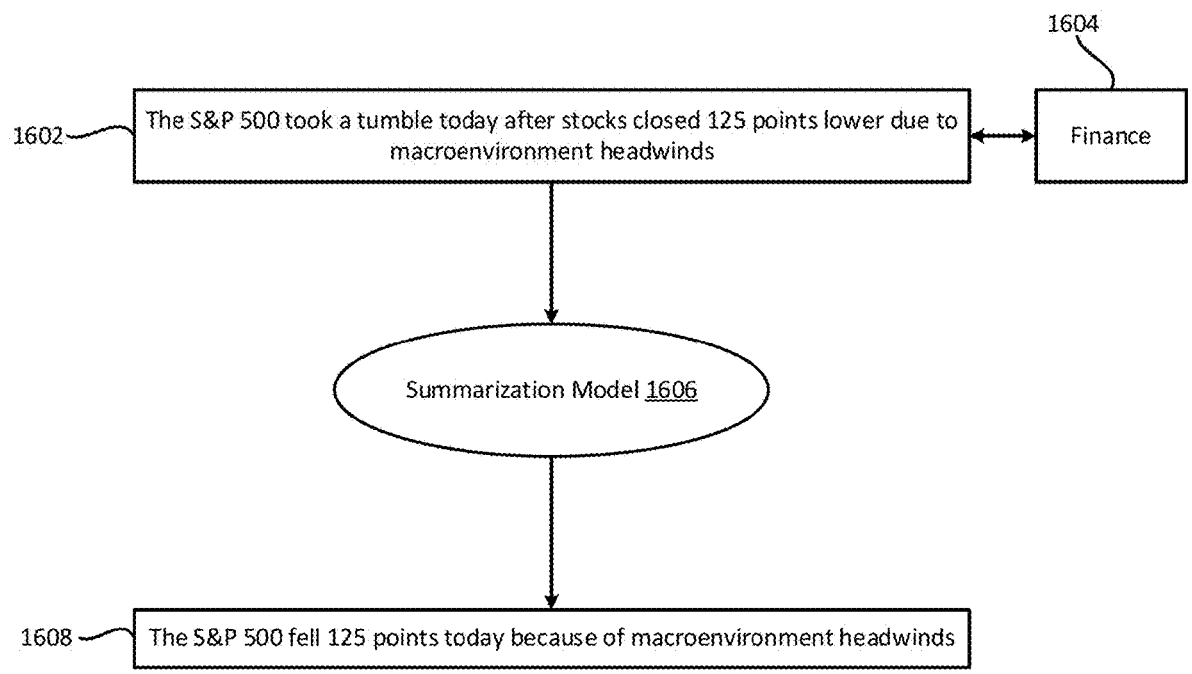
FIG. 16 shows an example of a process for summarizing a text sample using a summarization model according to some aspects of the present disclosure.

In block 1502, the computer system provides the set of text samples as input to one or more summarization models to receive a set of summaries as output from the one or more summarization models. One example of this process is shown in FIG. 16. As shown, the computer system can provide a text sample 1602 as input to a summarization model 1606. The text sample 1602 may have a corresponding category label 1604. Examples of the summarization model 1606 can include a seq2seq model, a LSTM recurrent neural network, and a BERT model. The summarization model 1606 can receive the text sample 1602 and generate a summary 1608 of the text sample 1602, where the summary 1608 is in textual form. The summarization model 1606 can then output the summary 1608.

Next, the computer system can execute a training-sample generation process 1520. The training-sample generation process can be an iterative process for generating training samples to be included in the training data. The iterative process can repeat until a stopping condition is met. In some examples, the training-sample generation process can include blocks 1504-1518 described below.

In block 1504, the computer system selects two or more text samples from the set of text samples. The computer system can select the two or more text samples using any suitable technique. For example, the computer system can randomly select the two or more samples. Alternatively, the computer system can select the two or more text samples according to a predefined algorithm. The algorithm may be configured to prevent or minimize repeated selection of the same text samples. In some examples, the algorithm may control the iterative process 1520 to select every possible grouping (e.g., pairing) of text samples from the set of text samples over the course of the iterative process 1520. For instance, the algorithm can be configured to select every possible permutation of the text samples in the set of text samples.

In block 1506, the computer system generates a training sample based on the two or more text samples. For example, the computer system can generate the training sample by aggregating parts of, or the entirety of, the two or more text samples together. As one particular example, the computer system can generate a training sample by concatenating at least a portion of a first text sample with at least a portion of a second text sample. This may yield a single text string that can serve as the training sample.

In block 1508, the computer system determines a text category corresponding to a selected text sample of the two or more text samples. For example, the computer system can first select a text sample from among the two or more text samples. In some examples, the computer system can randomly select the text sample. Alternatively, the computer system can select a text sample from among the two or more text samples according to a predefined algorithm. The algorithm may be configured to prevent or minimize repeated selection of the same text sample. After selecting a text sample, the computer system can determine the text category associated with the text sample. For example, the computer system can read a category label from the metadata of the selected text sample. Based on the category label, the computer system can determine the text category corresponding to the selected text sample.

In block 1510, the computer system incorporates an identifier of the text category into the training sample. For example, the computer system may have access to a predefined mapping of text categories to identifiers. So, the computer system can use the predefined mapping to determine an identifier corresponding to the text category. The computer system can then incorporate the identifier into the training sample. Incorporating the identifier into the training sample may involve appending the identifier to the end of the training sample, prepending the identifier to the beginning of the training sample, or positioning the identifier elsewhere in the training sample. As another example, the computer system can extract a category label from the metadata of the selected text sample. Since the category label can serve as the identifier, the computer system can then incorporate the category label into the training sample.

In block 1512, the computer system selects a summary corresponding to the selected text sample. The summary can be selected from among the set of summaries generated in block 1502. For example, the computer system can determine that a particular summary, in the set of summaries, corresponds to the selected text sample. So, the computer system can select that summary for subsequent use.

In some examples, the computer system can determine which summary corresponds to the selected text sample based on a predefined mapping of summaries to text samples. For example, for each summary generated in block 1502, the computer system can generate a new entry in the mapping that correlates the summary to its corresponding text sample (e.g., the text sample from which the summary was derived). The computer system can then use the mapping in block 1512 to lookup which summaries correspond to which text samples.

In block 1514, the computer system incorporates the summary into the training sample. Incorporating the summary into the training sample may involve appending the summary to the end of the training sample, prepending the summary to the beginning of the training sample, or positioning the summary elsewhere in the training sample.

In block 1516, the computer system stores the training sample as part of a training dataset. The training sample can serve as a single entry in the training dataset. For example, the computer system can store the training sample in memory for use as part of the training dataset.

In block 1518, the computer system determines whether a stopping condition has been met. Examples of the stopping condition can include a certain number of training samples being generated, a certain amount of time elapsing, or a certain amount of disk space being consumed. If the stopping condition has been met, the process can end. Otherwise, the process can return to block 1504 and repeat based on another selection of two or more text samples.

Figure 17:
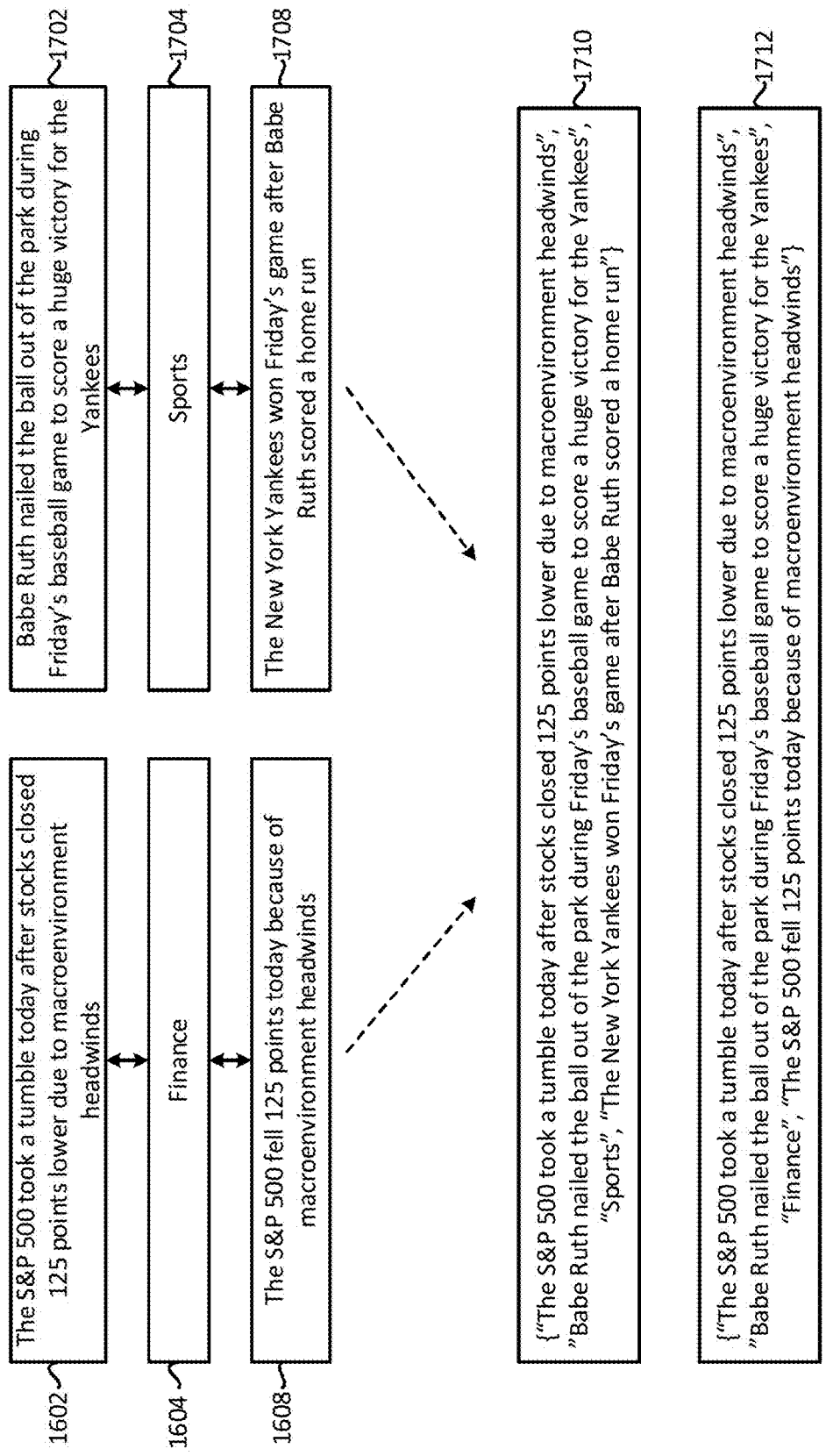
FIG. 17 shows an example of a process for generating training samples based on text samples according to some aspects of the present disclosure.

FIG. 17 shows two examples of training samples generated according to the training-sample generation process 1520 described above. The first training sample 1710 includes a first text sample 1602 and a second text sample 1702. The first training sample 1710 also includes a category label 1704 for a selected text sample, which in this example is the second text sample 1702. The first training sample 1710 further includes a summary 1708 generated for the selected text sample. Although the first training sample 1710 has the first text sample 1602, second text sample 1702, category label 1704, and summary 1708 concatenated in a certain order, this is intended to be illustrative and non-limiting. Other examples may have those fields in other orders.

The second training sample 1712 includes the first text sample 1602 and the second text sample 1702. The second training sample 1712 also includes a category label 1604 for a selected text sample, which in this example is the first text sample 1602. The second training sample 1712 further includes a summary 1608 generated for the selected text sample. Although the second training sample 1712 has the first text sample 1602, second text sample 1702, category label 1604, and summary 1608 concatenated in a certain order, this is intended to be illustrative and non-limiting. Other examples may have those fields in other orders.

The training samples 1710, 1712 can be incorporated into training data for use in training a model. The model may be the same as or different from the summarization model(s) used in block 1502. In some examples, thousands (or hundreds of thousands) of training samples may be generated and incorporated into the training data. The model can then be trained using the training data. More specifically, during the training process, rather than matching one summary to one text sample, multiple summaries are matched to the same text sample. And each summary is connected to a category (e.g., a theme, sentiment, or other property) implicitly present in the text sample. As a result, each training sample indicates to the model which contextualized summary it should learn to match by concatenating a category qualifier token to the end of the text sample. The model learns the meaning of this token as part of training.

Figure 18:
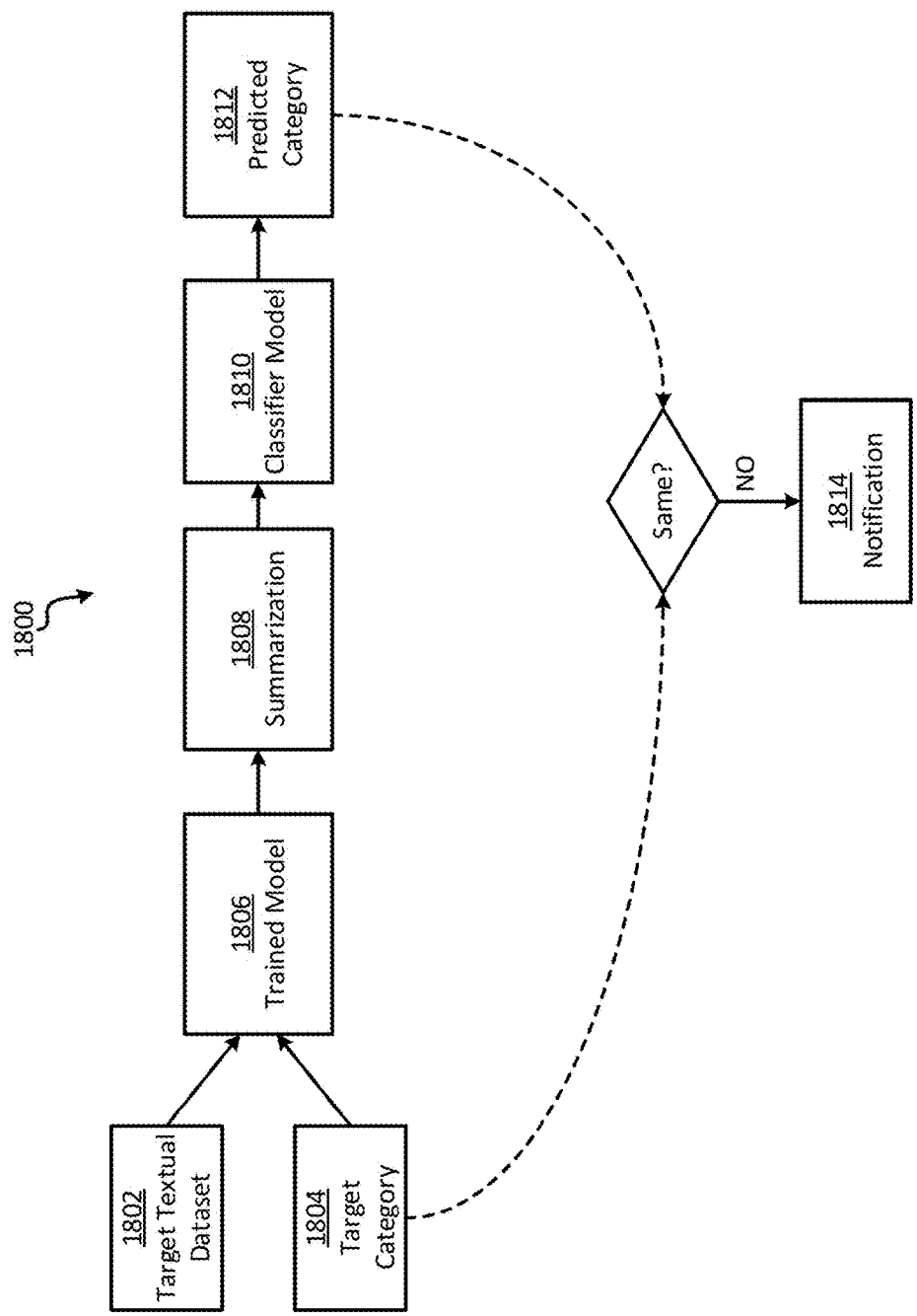
FIG. 18 shows an example of a process for validating the accuracy of a trained model according to some aspects of the present disclosure.

After training the model using the training samples, a classifier model can be used to validate the accuracy of the trained model. One example of this process 1800 is shown in FIG. 18. As shown, a computer system can obtain (e.g., receive or generate) a target textual dataset 1802. One example of the target textual dataset 1900 is shown in FIG. 19. In this example, the target textual dataset 1900 is an aggregation sports news, business news, and technology news. After obtaining the target textual dataset 1802, the computer system can supply the target textual dataset 1802 as input to the trained model 1806. The trained model 1806 can be a summarization model that was previously trained using the training data described above. The target textual dataset 1802 may exclude information previously seen by the model 1806 during training. For example, the target textual dataset 1802 may be different from the training samples, and the set of text samples, from which the training data was derived.

The computer system can also supply a target category 1804 as input to the trained model 1806. The target category 1804 can be supplied as input to the trained model 1806 before, concurrently with, or after the target textual dataset 1802. The target category 1804 can be a category of interest to a user. For example, the user may want the trained model 1806 to summarize the technology news in the target textual dataset 180. So, the user may select "technology" as the target category 1804.

The target category 1804 can be provided as input to the trained model 1806 in any suitable format that is compatible with the trained model 1806. This can depend on the architecture of the trained model 1806. For example, the target category 1804 may be a numerical value (e.g., "4") corresponding the category of interest, where different categories have different corresponding numerical values. As another example, the target category 1804 may be a term or phrase (e.g., "tech") corresponding the category of interest, where different categories have different corresponding terms or phrases.

The trained model 1806 can receive the inputs (e.g., the target textual dataset 1802 and the target category 1804) and generate a summarization 1808 based on the inputs. In particular, the trained model 1806 can receive the inputs, determine a subset of the target textual dataset 1802 that corresponds to the target category 1804, and generate the summarization 1808 based on the subset. The summarization 1808 may be derived only from the subset that corresponds to the target category 1804 and, therefore, may not be derived from any other parts of the target textual dataset 1802 that do not correspond to the target category 1804.

Next, the computer system can provide the summarization 1808 as input to a classifier model 1810. The classifier model 1810 is separate from the trained model 1806. Examples of the classifier model 1810 can include a Naive Bayes classifier, support vector machine, or a neural network. The classifier model 1810 can be configured to receive the summarization 1808 and output a predicted category 1812 associated with the summarization 1808. In this context, the predicted category 1812 can be whichever text category the classifier model 1810 has determined to best correspond to the summarization 1808. In some examples, the classifier model 1810 can be an interpretable model that is capable of providing details about why it made a certain classification so that the user can better understand the underlying classification process. Examples of such interpretable models can include Naive Bayes classifiers, k-nearest neighbor classifiers, logistic regression classifiers, and decision trees.

To generate the predicted category 1812, the classifier model 1810 may have previously been trained using a second set of training data that is different from the first set of training data used to train the model 1806. For example, the classifier model 1810 can be trained using a second set of training data that includes text summaries correlated to their target categories. In some such examples, the text summaries can be prelabeled with their target categories. The second set of training data can then be used in a supervised learning process to train the classifier model 1810.

The computer system can next compare the predicted category 1812 from the classifier model 1810 to the target category 1804 input to the trained model 1806. If the two match (e.g., they are the same), then the computer system can determine that the trained model 1806 is sufficiently accurate. Otherwise, the computer system can determine that the trained model 1806 is inaccurate. If the computer system determines that the trained model 1806 is inaccurate, the computer system may execute one or more remedial operations. For example, the computer system may further train the model 1806 (e.g., using the summarization 1808 and the predicted category 1812 as additional training data) in an effort to improve its accuracy. This additional training may be performed automatically by the computer system, for example in response to the computer system detecting the mismatch between the predicted category 1812 and the target category 1804. Additionally or alternatively, the computer system may transmit a notification 1814 indicating that the trained model 1806 is inaccurate. The notification 1814 may also include additional information, such as an explanation of why the classifier model 1810 chose its predicted classification (e.g., if the classifier model 1810 is an interpretable model), to assist a recipient of the notification in understanding why the mismatch occurred. In some examples, the notification 1814 can be transmitted over a network to one or more client devices associated with one or more entities. This may alert the one or more entities of the problem, so that they can try to fix it.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more storage devices including instructions that are executable by the one or more processors for causing the one or more processors to:
receive a plurality of text samples corresponding to a plurality of text categories, each text sample of the plurality of text samples corresponding to a respective category of the plurality of text categories;
provide the plurality of text samples as input to a summarization model that is configured to generate a plurality of summaries of the plurality of text samples;
generate a training dataset by iteratively performing a training-sample generation process until a stopping condition is met, the training-sample generation process involving:
selecting a first text sample and a second text sample from the plurality of text samples, wherein the first text sample and the second text sample correspond to different categories of the plurality of text categories;
generating a training sample that includes the first text sample and the second text sample;
determining a text category corresponding to the first text sample;
incorporating an identifier of the text category into the training sample;
selecting a summary corresponding to the first text sample from among the plurality of summaries;
incorporating the summary into the training sample; and
storing the training sample as part of the training dataset;
train a model based on the training dataset to generate a trained model, the trained model being configured to:
receive a target textual dataset and a target category as input, the target category being one of the plurality of text categories;
identify a portion of the target textual dataset corresponding to the target category; and
generate an output that includes a summarization of the portion of the target textual dataset corresponding to the target category.

2. The system of claim 1, wherein the one or more storage devices further include instructions that are executable by the one or more processors for causing the one or more processors to:
generate another text string that includes the first text sample and the second text sample;
select another summary from the plurality of summaries corresponding to the second text sample;
incorporate the other summary into the other text string;
determine another text category corresponding to the second text sample;
incorporate another identifier of the other text category into the other text string; and
store the other text string as another training sample in the training dataset.

3. The system of claim 1, wherein the plurality of text categories include a plurality of topics.

4. The system of claim 1, wherein the one or more storage devices further include instructions that are executable by the one or more processors for causing the one or more processors to:
provide the summarization as input to a trained classifier model, the trained classifier model being configured to output a predicted category associated with the summarization;
compare the predicted category to the target category; and
in response to determining that there is a difference between the predicted category and the target category based on the comparison, transmit a notification indicating that the model produced an erroneous summary.

5. The system of claim 4, wherein the trained classifier model is an interpretable model configured to provide an explanation of why it selected the predicted category, and wherein the notification include the explanation.

6. The system of claim 4, wherein the one or more storage devices further include instructions that are executable by the one or more processors for causing the one or more processors to generate the trained classifier model by training a classifier model based on the plurality of text samples.

7. The system of claim 1, wherein the model includes the summarization model.

8. The system of claim 1, wherein the plurality of text categories correspond to a plurality of sentiments, and wherein the plurality of sentiments include positive sentiment and negative sentiment.

9. The system of claim 1, wherein the one or more storage devices further include instructions that are executable by the one or more processors for causing the one or more processors to:
select at least a subset of text samples from the plurality of text samples; and
generate the training dataset by performing the training-sample generation process on every possible pair of text samples in the subset of text samples.

10. The system of claim 1, wherein the one or more storage devices further include instructions that are executable by the one or more processors for causing the one or more processors to:
determine the text category corresponding to the first text sample based on an assignment of the text category to the first text sample in the plurality of text samples.

11. A method comprising:
receiving, by one or more processors, a plurality of text samples corresponding to a plurality of text categories, each text sample of the plurality of text samples corresponding to a respective category of the plurality of text categories;
providing, by the one or more processors, the plurality of text samples as input to a summarization model that is configured to generate a plurality of summaries of the plurality of text samples;
generating, by the one or more processors, a training dataset by iteratively performing a training-sample generation process until a stopping condition is met, the training-sample generation process involving:
selecting a first text sample and a second text sample from the plurality of text samples, wherein the first text sample and the second text sample correspond to different categories of the plurality of text categories;
generating a training sample that includes the first text sample and the second text sample;

determining a text category corresponding to the first text sample;
incorporating an identifier of the text category into the training sample;
selecting a summary corresponding to the first text sample from among the plurality of summaries;
incorporating the summary into the training sample; and
storing the training sample as part of the training dataset;
training, by the one or more processors, a model based on the training dataset to generate a trained model, the trained model being configured to:
receive a target textual dataset and a target category as input, the target category being one of the plurality of text categories;
identify a portion of the target textual dataset corresponding to the target category; and
generate an output that includes a summarization of the portion of the target textual dataset corresponding to the target category.

12. The method of claim 11, further comprising:
generating another text string that includes the first text sample and the second text sample;
selecting another summary from the plurality of summaries corresponding to the second text sample;
incorporating the other summary into the other text string;
determining another text category corresponding to the second text sample;
incorporating another identifier of the other text category into the other text string; and
storing the other text string as another training sample in the training dataset.

13. The method of claim 11, wherein the plurality of text categories include a plurality of topics.

14. The method of claim 11, further comprising:
providing the summarization as input to a trained classifier model, the trained classifier model being configured to output a predicted category associated with the summarization;
comparing the predicted category to the target category; and
in response to determining that there is a difference between the predicted category and the target category based on the comparison, transmitting a notification indicating that the model produced an erroneous summary.

15. The method of claim 14, wherein the trained classifier model is an interpretable model configured to provide an explanation of why it selected the predicted category, and wherein the notification include the explanation.

16. The method of claim 14, further comprising generating the trained classifier model by training a classifier model based on the plurality of text samples.

17. The method of claim 11, wherein the model includes the summarization model.

18. The method of claim 11, wherein the plurality of text categories correspond to a plurality of sentiments, and wherein the plurality of sentiments include positive sentiment and negative sentiment.

19. The method of claim 11, further comprising:
selecting at least a subset of text samples from the plurality of text samples; and
generating the training dataset by performing the training-sample generation process on every possible pair of text samples in the subset of text samples.

20. The method of claim 11, further comprising:
determining the text category corresponding to the first text sample based on an assignment of the text category to the first text sample in the plurality of text samples.

21. A non-transitory computer-readable medium comprising program code that is executable by one or more processors for causing the one or more processors to:
receive a plurality of text samples corresponding to a plurality of text categories, each text sample of the plurality of text samples corresponding to a respective category of the plurality of text categories;
provide the plurality of text samples as input to a summarization model that is configured to generate a plurality of summaries of the plurality of text samples;
generate a training dataset by iteratively performing a training-sample generation process until a stopping condition is met, the training-sample generation process involving:
selecting a first text sample and a second text sample from the plurality of text samples, wherein the first text sample and the second text sample correspond to different categories of the plurality of text categories;
generating a training sample that includes the first text sample and the second text sample;
determining a text category corresponding to the first text sample;
incorporating an identifier of the text category into the training sample;
selecting a summary corresponding to the first text sample from among the plurality of summaries;
incorporating the summary into the training sample; and
storing the training sample as part of the training dataset;
train a model based on the training dataset to generate a trained model, the trained model being configured to:
receive a target textual dataset and a target category as input, the target category being one of the plurality of text categories;
identify a portion of the target textual dataset corresponding to the target category; and
generate an output that includes a summarization of the portion of the target textual dataset corresponding to the target category.

22. The non-transitory computer-readable medium of claim 21, further comprising program code that is executable by the one or more processors for causing the one or more processors to:
generate another text string that includes the first text sample and the second text sample;
select another summary from the plurality of summaries corresponding to the second text sample;
incorporate the other summary into the other text string;
determine another text category corresponding to the second text sample;
incorporate another identifier of the other text category into the other text string; and
store the other text string as another training sample in the training dataset.

23. The non-transitory computer-readable medium of claim 21, wherein the plurality of text categories include a plurality of topics.

24. The non-transitory computer-readable medium of claim 21, further comprising program code that is executable by the one or more processors for causing the one or more processors to:

provide the summarization as input to a trained classifier model, the trained classifier model being configured to output a predicted category associated with the summarization;

compare the predicted category to the target category; and in response to determining that there is a difference between the predicted category and the target category based on the comparison, transmit a notification indicating that the model produced an erroneous summary.

25. The non-transitory computer-readable medium of claim 24, wherein the trained classifier model is an interpretable model configured to provide an explanation of why it selected the predicted category, and wherein the notification include the explanation.

26. The non-transitory computer-readable medium of claim 24, further comprising program code that is executable by the one or more processors for causing the one or more processors to:

generate the trained classifier model by training a classifier model based on the plurality of text samples.

27. The non-transitory computer-readable medium of claim 21, wherein the model includes the summarization model.

28. The non-transitory computer-readable medium of claim 21, wherein the plurality of text categories correspond to a plurality of sentiments, and wherein the plurality of sentiments include positive sentiment and negative sentiment.

29. The non-transitory computer-readable medium of claim 21, further comprising program code that is executable by the one or more processors for causing the one or more processors to:

select at least a subset of text samples from the plurality of text samples; and generate the training dataset by performing the training-sample generation process on every possible pair of text samples in the subset of text samples.

30. The non-transitory computer-readable medium of claim 21, further comprising program code that is executable by the one or more processors for causing the one or more processors to:

determine the text category corresponding to the first text sample based on an assignment of the text category to the first text sample in the plurality of text samples.

* * * * *